(12) United States Patent
Lipasek et al.

(10) Patent No.: US 8,209,208 B2
(45) Date of Patent: Jun. 26, 2012

(54) SUCCESSION OF AN ASSET IN CONTROL IN RESPONSE TO A LEVEL OF USER INTERVENTION

(75) Inventors: John J. Lipasek, Fort Wayne, IN (US); Cheryl R. Erickson, Fort Wayne, IN (US); Barry E. Thelen, Decatur, IN (US); Jeffery A. Stanford, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 429 days.

(21) Appl. No.: 12/547,610

(22) Filed: Aug. 26, 2009

(65) Prior Publication Data

US 2011/0054975 A1    Mar. 3, 2011

(51) Int. Cl.
*G06F 17/00* (2006.01)

(52) U.S. Cl. ...................................................... 705/7.13

(58) Field of Classification Search ................... 705/7.13
See application file for complete search history.

(56) References Cited

U.S. PATENT DOCUMENTS

| | | | | |
|---|---|---|---|---|
| 5,164,897 | A * | 11/1992 | Clark et al. ................... | 705/321 |
| 7,805,382 | B2 * | 9/2010 | Rosen et al. .................. | 705/321 |
| 7,912,790 | B2 * | 3/2011 | Albertsson .................... | 705/321 |
| 2007/0185757 | A1 * | 8/2007 | Subramanian ................. | 705/10 |
| 2008/0294627 | A1 * | 11/2008 | Wadsworth ..................... | 707/5 |
| 2009/0070316 | A1 * | 3/2009 | Beauchesne et al. ............. | 707/5 |

* cited by examiner

*Primary Examiner* — Thomas Dixon

(74) *Attorney, Agent, or Firm* — Daly, Crowley, Mofford & Durkee, LLP (57) ABSTRACT

In one aspect, a system includes a processor configured to determine or receive a candidate to succeed an asset in control in response to a level of user intervention selected by a user from a plurality of levels of user intervention, determine if the candidate is available and determine if the candidate is qualified. The processor is also configured to designate the candidate as successor to succeed the asset in control if the candidate is available and qualified.

20 Claims, 9 Drawing Sheets

SUCCESSION OF AN ASSET IN CONTROL IN RESPONSE TO A LEVEL OF USER INTERVENTION

BACKGROUND

When a primary or subordinate asset becomes unavailable to support their responsibilities it must be replaced. Notification triggering or facilitating control succession is traditionally performed ad hoc. Superiors are not immediately notified when the primary or subordinate asset has become unavailable. Instead, superiors must either determine that an asset has become unavailable or receive some type of external notification. In some instances, the time period before notification is received can be hours or days. In certain critical functions, this is unacceptable. In addition, control succession is manpower intensive (i.e., manually initiated and intensive), slow, and prone to error.

SUMMARY

In one aspect, a system includes a processor configured to determine if a candidate to succeed an asset in control is available and determine if the candidate is qualified. The processor is also configured to designate the candidate as the successor if the candidate to succeed the asset in control is available and qualified.

In another aspect, an article includes a machine-readable medium that stores executable instructions that cause a machine to determine if a candidate to succeed an asset in control is available, qualified and approved by an authority and designate the candidate as the successor if the candidate to succeed the asset in control is available, qualified and approved by an authority.

In a further aspect, a method includes using a processor to determine if a candidate to succeed an asset in control is available, qualified and approved by an authority and designate the candidate as the successor if the candidate to succeed the asset in control is available, qualified and approved by an authority. The method also includes using the processor to notify affected resources of the successor and perform updates based on the successor. The asset in control includes at least one of a person or at least one of a physical entity.

DETAILED DESCRIPTION

Described herein are techniques to provide control succession when an asset (e.g., person or thing) is unavailable or cannot perform its functions. For example, when a leader of an organization is unavailable, the techniques described herein provide or assist in providing a new leader. While the techniques may be used to find a new leader, the techniques also may be used to determine succession in terms of hardware. For example, if a radar has radar coverage over an area and then becomes unavailable, a new radar is determined to provide radar coverage for the area. In another example, succession may occur when an unmanned air vehicle passes from the airspace of one controller to that of another controller. Also described herein is functionality to assume control when a new asset becomes available (e.g., when a previous asset in control that was unavailable becomes available again). Further described herein is functionality to appoint an asset in control.

Figure 1:
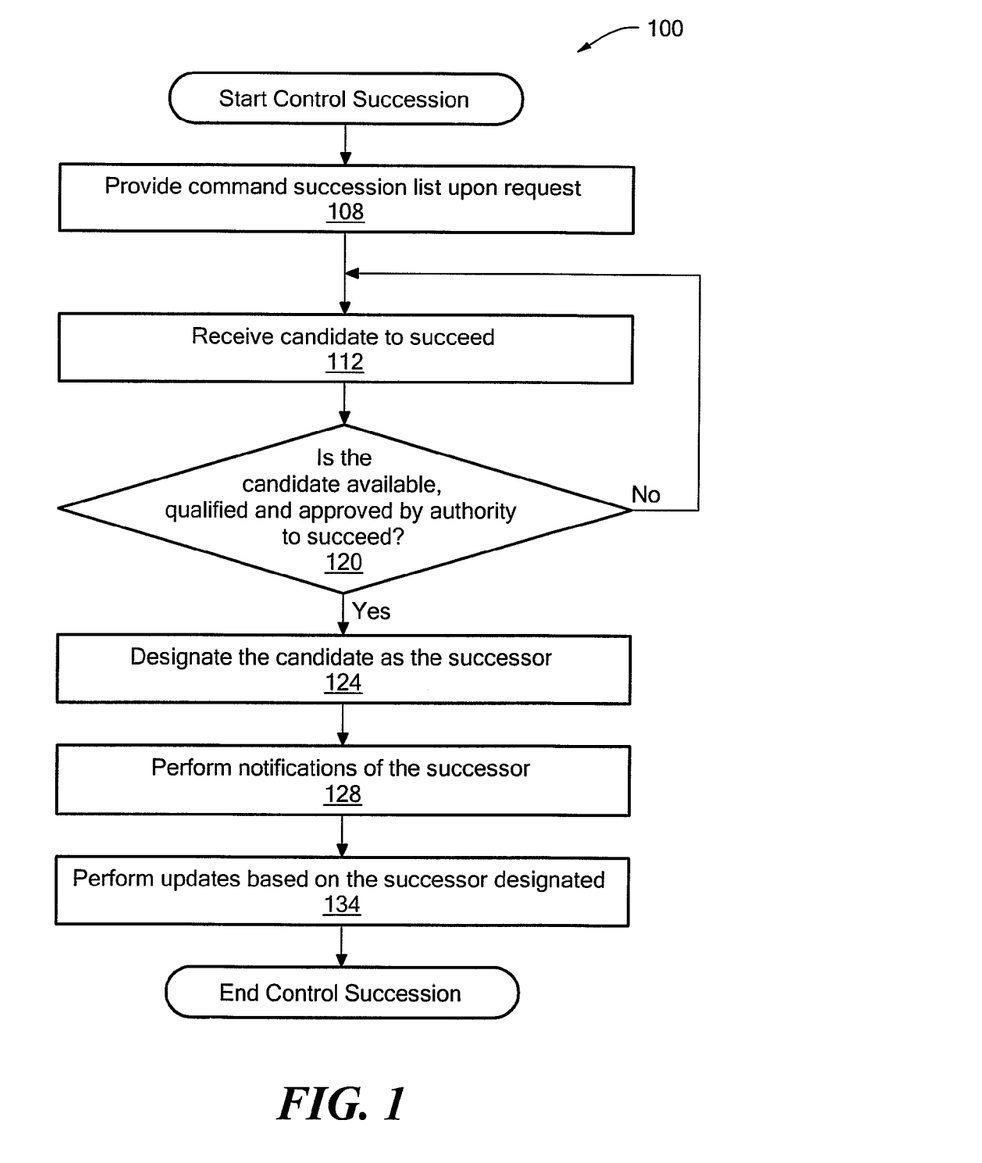
FIGS. 1 to 5 are examples of flowcharts to provide control succession using different levels of user intervention.

Referring to FIG. 1, one example of a process to provide control succession functionality is a process 100. An authority determines that an asset in control is unavailable. As used herein the asset in control may be a person or a thing (i.e., physical entity). The asset in control may be more than one person such as a unit. The asset in control may be a hardware system. The asset in control may also be a combination of people and physical entities. For example, the asset in control may be a leader of an organization such as a chief executive officer (CEO) or a military commander. In another example, the asset in control may be a primary system or lead system performing a function. Unavailability may be when the asset in control is no longer in communications coverage (e.g., out of a reception area), temporarily incapacitated, or any other situation for which the asset in control can no longer function as the lead. The authority may be a supervisor of the asset in control or higher echelon supervisor.

A command succession list is provided upon request (108), for example, upon request of the authority. The command succession list contains a list of assets that are candidates to take control of the responsibilities that the asset in control that is no longer available to perform. The authority (or a designated authority) makes a selection from the command succession list. The candidate to succeed is received (112) and it is determined whether the candidate is available, qualified and approved by the authority to succeed (120). Candidate qualifications are objective in nature and are usually predetermined by an authority. In one example, in the case of personnel, qualifications include a person's area of expertise, education, and/or whether the person has the experience to support a particular set of responsibilities. In another example, in the case of hardware, qualifications include an ability to support a particular function (e.g.; can a truck carry a particular freight) or perform a task or a set of tasks (e.g., perform a mission). In one example, candidates are pre-approved before a mission by an authority. Candidate pre-approval can be objective and/or subjective in nature. Candidates can be pre-approved before a mission and be disapproved during the mission due to extenuating circumstances. In one example, with hardware, disapproval may occur when a radar has been pre-approved but during a mission it is determined that the radar lacks coverage within a particular area. In another example, with personnel, a person has been pre-approved but during the mission, the person has sustained an injury which hampers their ability to support the required responsibilities going forward. If the candidate is not available, qualified or approved by the authority a new candidate is selected by the authority. If the candidate is available, qualified and approved by the authority, the candidate is designated as the successor (124).

Notifications are sent to make relevant resources aware that there is a successor (128). For example, messages are sent to relevant systems and/or people that there is a successor and that the asset in control is no longer in control. The notifications may include orders and/or instructions. Updates are performed based on the successor designated (134). For example, the successor receives new information, technology (IT) privileges, area access, security access and so forth as needed to perform the role as the new asset in control.

The process 100 may be further modified to allow varying levels of intervention (LOI) by a user. For example, the process 100 is considered a mostly manual selection process. In one example, the process 100 requires that the authority (or the authority's designate) manually initiate functionality supporting control succession. Thus, under process the 100, the authority determines that an asset is unavailable, requests the control succession list, and manually selects a successor from the command succession list.

Figure 2:
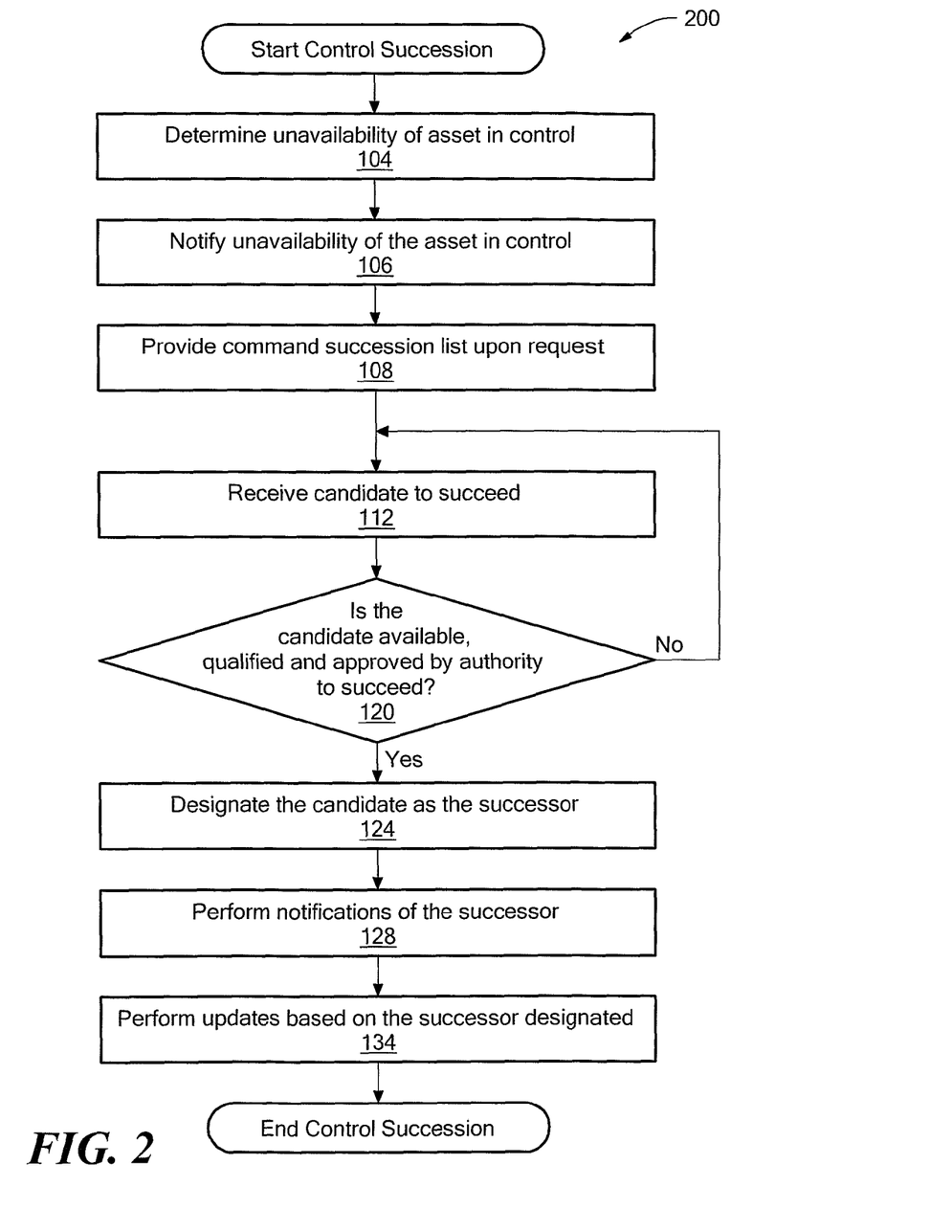

Referring to FIG. 2, another example of a control succession process is a process 200. Process 200 has less user intervention than process 100 and includes two additional processing blocks than process 100. For example, process 200 determines that the asset in control is unavailable (104) rather than the authority and makes a notification that the asset is unavailable (106) (e.g., making a notification to the authority).

Figure 3:
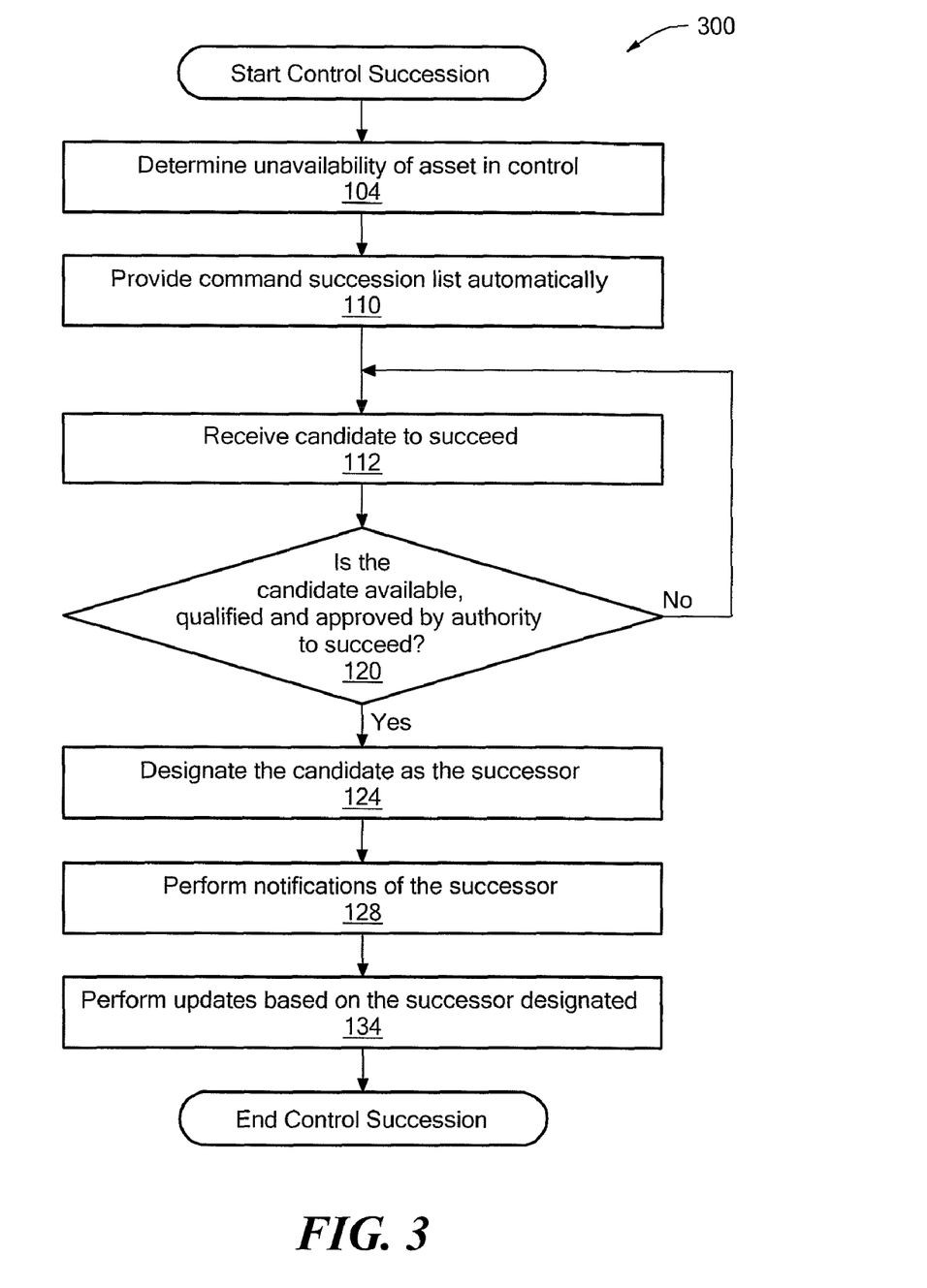

Referring to FIG. 3, another example of a control succession process is a process 300. Process 300 has less user intervention than process 200. For example, process 300 does not include process blocks 106 and 108 as in the process 200; but rather, the process 300 provides the command succession list automatically (110), for example, without receiving a request from the authority.

Figure 4:
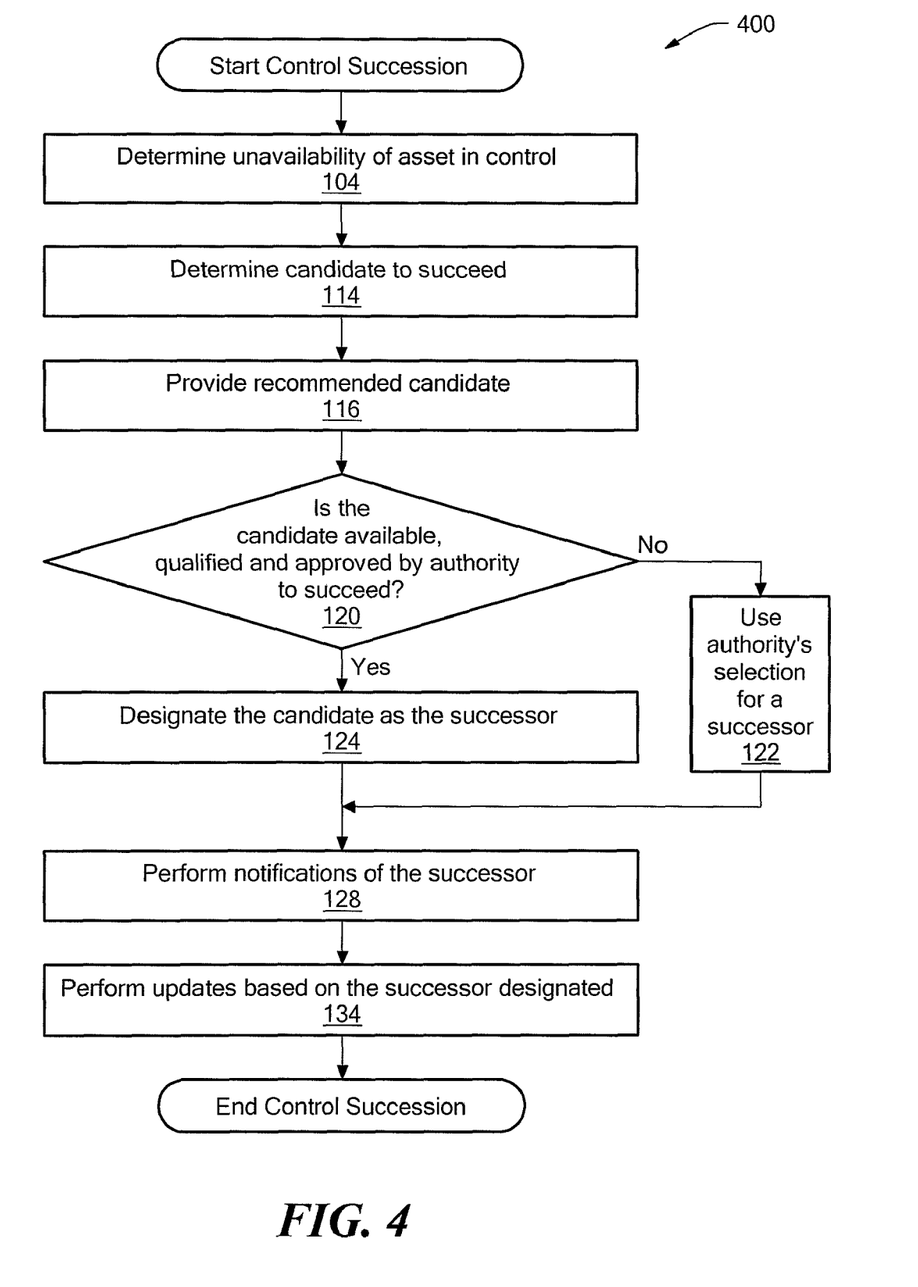

Referring to FIG. 4, another example of a control succession process is a process 400. Process 400 has less user intervention than process 300. For example, process 400 does not include processing blocks 110 and 112 as in the process 300; but rather, the process 400 determines a candidate to succeed (114) and provides a candidate (116), for example, to the authority. In one example, process 400 determines the candidate to succeed based on policies. The policies can support a disparate set of user requirements. In a military environment, for example, policies may comply with Field Manual 6-0—Mission Command: Command and Control of Army Forces, Field Manual 5-0—Army Planning and Orders Production, Army Regulation 600-20—Army Command Policy and/or other policy requirements. These policies may be designated by a user on a regular or ad hoc basis. In one particular example, a set of defined policies are stored (e.g., in a nonvolatile memory 826 (FIG. 8)). In other examples, a list, by priority, of candidate successor may be provided. If the candidate is not available, qualified and approved by the authority to succeed, process 400 uses the authority's selection for a successor (122).

Figure 5:
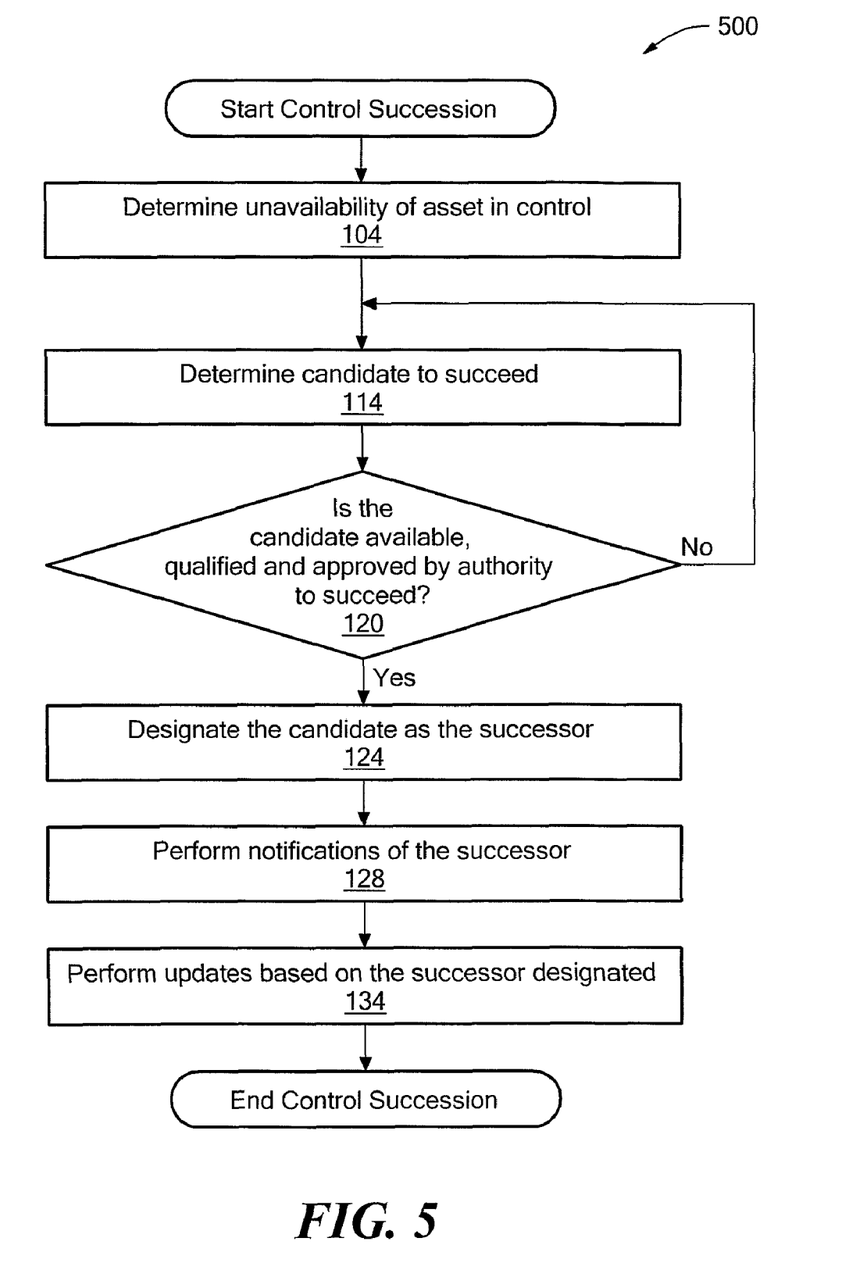

Referring to FIG. 5, another example of a control succession process is a process 500. Process 500 has less user intervention than process 400. For example, process 400 does not include processing blocks 116 and 122; but rather, the process 500 does not include user intervention.

Figure 6:
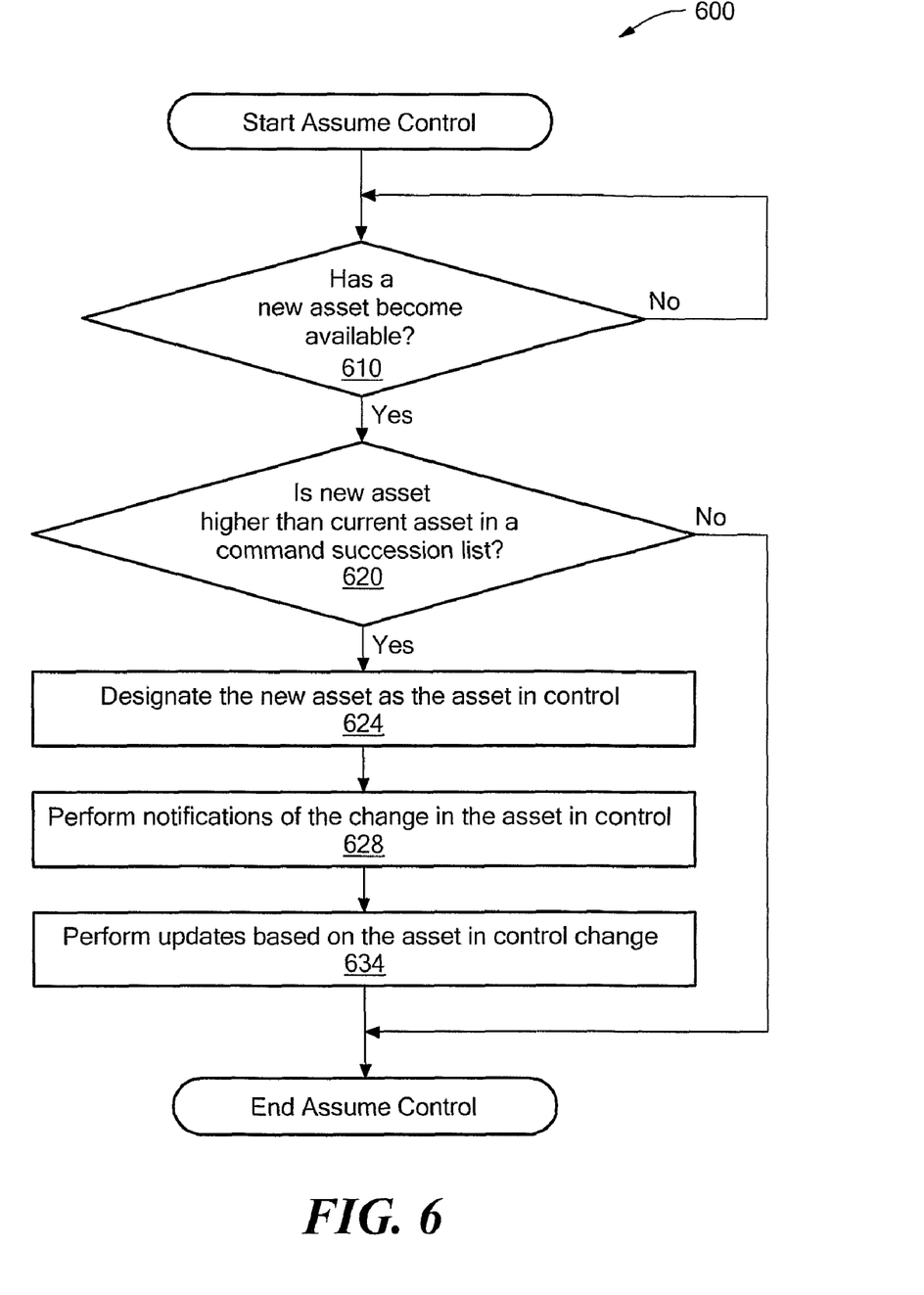
FIG. 6 is an example of a flowchart to provide an assume command functionality to control succession.

Referring to FIG. 6, an example of process to provide assume command functionality in control succession is a process 600. The assume command functionality is used when a new asset that potentially could become an asset in control becomes available. For example, a previous asset in control that was unavailable becomes available again. Process 600 determines if the new asset becomes available (610). For example, the new asset makes an electronic notification (e.g., logs in to computer 800 (FIG. 8), sends a signal and so forth). In other examples, the new asset is electronically detected as being available. If a new asset becomes available, process 600 determines if the new asset is the higher asset within the command succession list than the current asset in control (620). In one example, the command succession list contains a list of assets that potentially could be the asset in control that are prioritized. In another example, policy-based reasoning determines whether the new asset is the higher asset within the command succession list than the current asset in control and meets specific criteria (e.g., using policies 840 (FIG. 8)). If the new asset is the higher asset on the command succession list than the current asset in control, the new asset is designated as the asset in control (624). Notifications are sent to make relevant resources aware that there has been an asset in control change (628). For example, messages are sent to relevant systems and/or people that there is an asset change. The notifications may include orders and/or instructions. Updates are performed based on the change in the asset in control (634). For example, the asset assuming control receives new information, IT privileges, area access, security access and so forth as needed to perform the role as the asset in control. In one example, the asset losing control will have their privileges, area access, security access and so forth as needed revert to their original settings.

Figure 7:
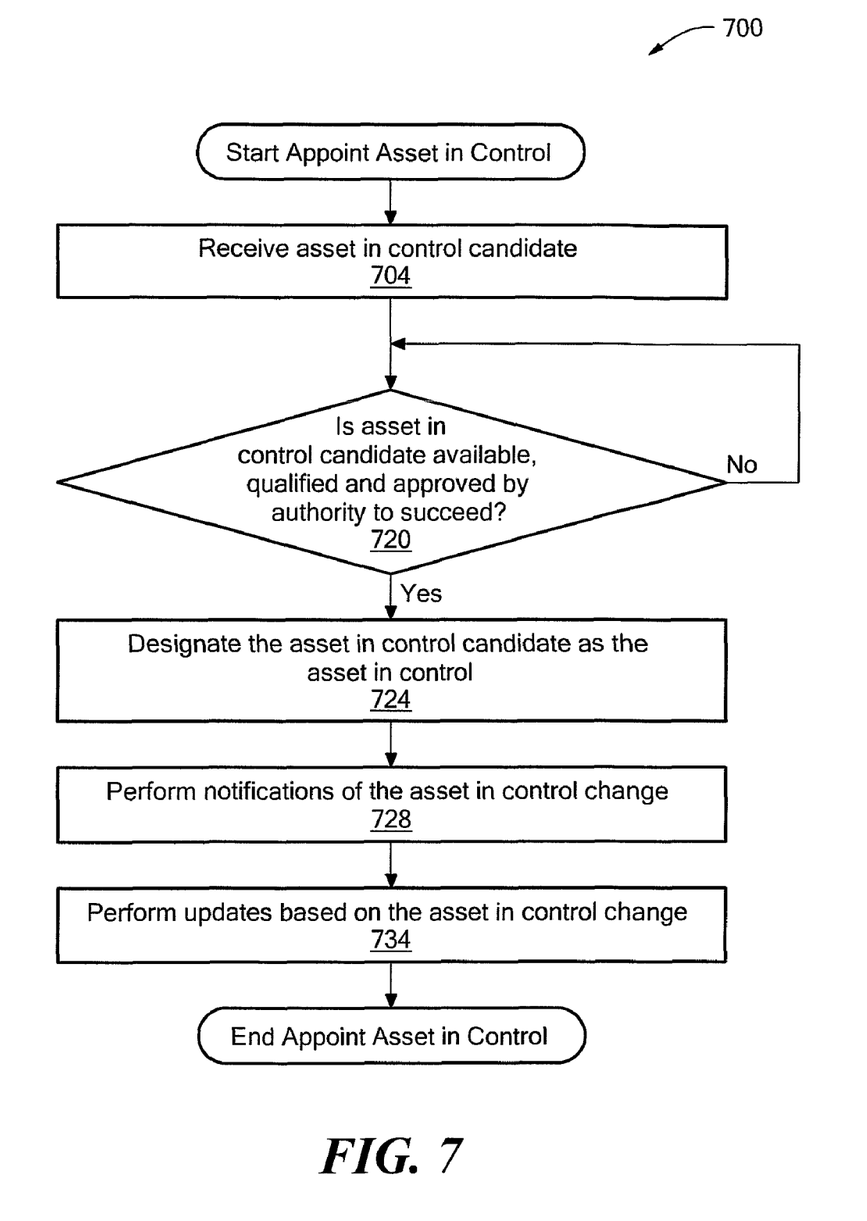
FIG. 7 is an example of a flowchart to provide an appoint asset in control functionality to control succession.

Referring to FIG. 7, an example of a process to appoint an asset in control is a process 700. The appointing an asset in control functionality allows an authority to bypass the control succession processes (e.g., bypassing the processes 100-500) and directly appoint an asset in control. Process 700 receives an asset in control candidate (704). Process 700 determines if the asset in control candidate is available, qualified and approved by the authority to succeed (720). If the asset in control candidate is available, qualified and approved by the authority, the asset in control candidate is designated as the asset in control (724).

Notifications are sent to make relevant resources aware that there has been an asset in control change (728). For example, messages are sent to relevant systems and/or people that there is an asset in control change. The notifications may include orders and/or instructions. Updates are performed based on the change in asset control (734). For example, the new asset in control receives new information, IT privileges, area access, security access and so forth as needed to perform the role as the new asset in control.

Figure 8:
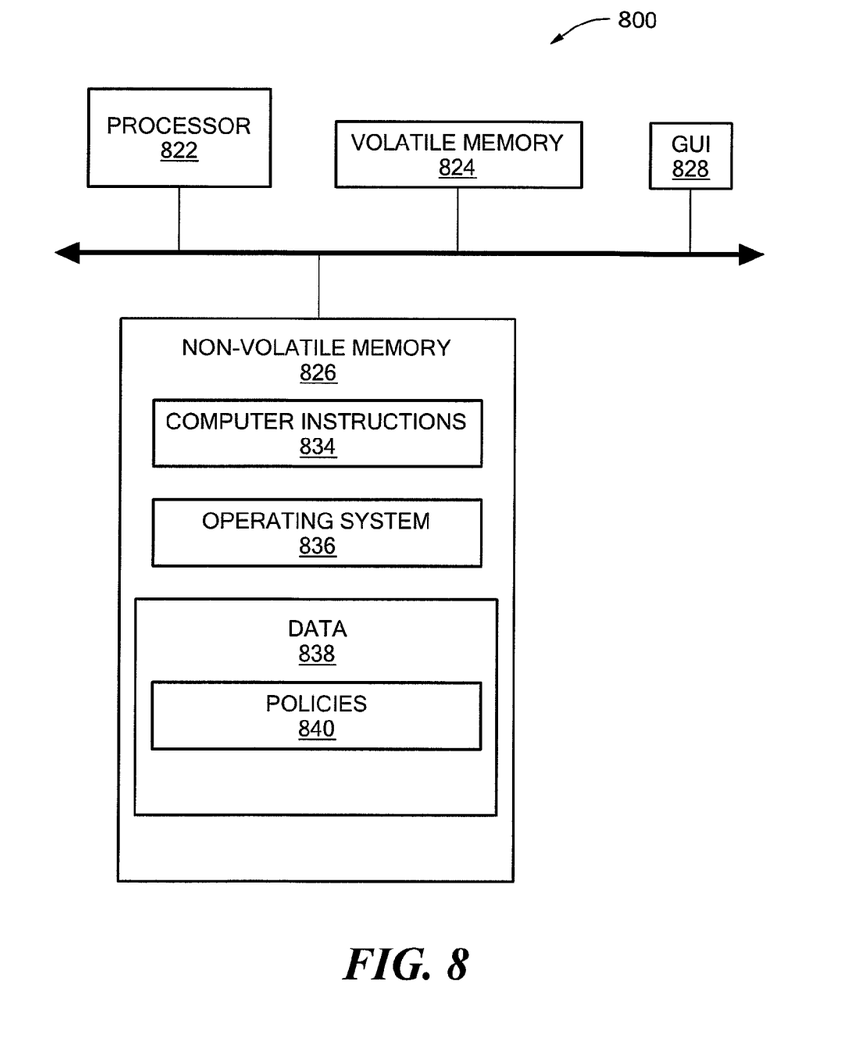
FIG. 8 is an example of a computer for which one or more of the processes of FIGS. 1 to 7 may be implemented.

Referring to FIG. 8, an example of a computer to provide control succession is a computer 800. The computer 800 includes a processor 822, a volatile memory 824, a non-volatile memory 826 (e.g., a hard disk) and a graphical user interface (GUI) 828 (e.g., a mouse, a touch screen, a keyboard, a display, for example). The non-volatile memory 826 stores computer instructions 834, an operating system 836 and data 838 including the policies 840, for example. In one example, data 838 includes qualifications to determine if a candidate is qualified to be an asset in control. In another example, data 838 includes a command succession list. In a further example, data 838 includes approved (e.g., pre-approved) candidates. In one example, the computer instructions 834 are executed by the processor 822 out of volatile memory 824 to perform all or part of the processes described herein (e.g., the processes 100, 200, 300, 400, 500, 600 and 700).

Figure 9:
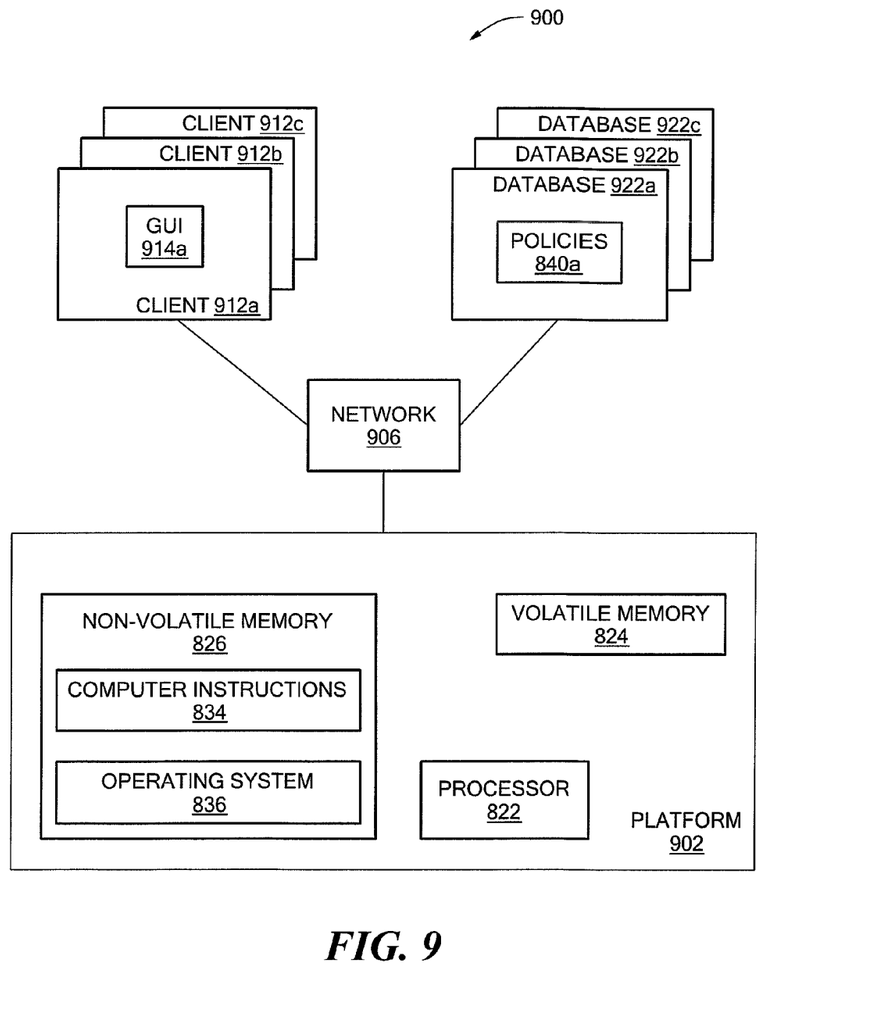
FIG. 9 is an example of a network environment for which one or more of the processes of FIGS. 1 to 7 may be implemented.

Referring to FIG. 9, control succession may be embodied within a network environment 900. The network environment 900 includes a platform 902 (e.g., a workstation, a laptop, a netbook, a handheld device and so forth). The platform 902 includes a processor 822, a volatile memory 824 and non-volatile memory 826. The network environment 900 also includes databases 922a, 922b, 922c and clients 912a, 912b, 912c, each client having a respective GUI 914 (e.g., a mouse, a touch screen, a keyboard, a display, for example) (only 914a is shown). The databases 922a, 922b, 922c each include respective policies 840 (only policies 840a are shown). In one example, databases 922a-922c includes data similar to data 838 (FIG. 8). In one example, the database 922a is assigned to client 912a, the database 922b is assigned to client 912b and the database 922c is assigned to the database 912c. In another example, clients 912a-912c are assigned more than one database 922a-922c. The platform 902, the clients 912a-912c and the databases 922a-922c communicate with each other through a network 906 (e.g., a wide arc network (WAN), local area network (LAN), internet, intranet and so forth).

In one example, the client 912a using the GUI 914a invokes control succession functionality located on the platform 902. The platform 902 uses invocation parameters to associate a specific set of database resources 922a to support the requesting clients 912a. For example, the policies 840a are downloaded to the non-volatile memory 826 of the platform 902. These parameters allow control succession contained within the non-volatile memory 826 to support the client's control succession requirements supported by its resources and policies 840a. The client's 912a assigned database 922a is updated to contain the current control succession information. Additionally, output notifications are sent to other clients (e.g., the client 912b, the client 912c) associated with the requesting client 912a.

The processes described herein (e.g., processes 100, 200, 300, 400, 500, 600 and 700) are not limited to use with the hardware and software configuration shown in FIGS. 8 and 9; they may find applicability in any computing or processing environment and with any type of machine or set of machines that are capable of running a computer program. The processes described herein may be implemented in hardware, software, or a combination of the two. The processes described herein may be implemented as a set or subset of services in computer programs executed on programmable computers/machines that each includes a processor, a storage medium or other article of manufacture that is readable by the processor (including volatile and non-volatile memory and/or storage elements), at least one input device, one or more output devices, and a network connection. Program code may be applied to data entered using an input device to perform the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein (e.g., processes 100, 200, 300, 400, 500, 600 and 700). The processes described herein may also be implemented as a machine-readable storage medium, configured with a computer program, where upon execution, instructions in the computer program cause the computer to operate in accordance with the processes.

The processes described herein are not limited to the specific embodiments described. For example, the processes 100-700 are not limited to the specific processing order of FIGS. 1 to 7. Rather, any of the processing blocks of FIGS. 1 to 7 may be re-ordered, combined or removed, performed in parallel or in serial, as necessary, to achieve the results set forth above.

The processing blocks in FIGS. 1 to 7 associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A system, comprising:
a processor configured to:
determine or receive a candidate to succeed an asset in control in response to a level of user intervention selected by a user from a plurality of levels of user intervention;
determine if the candidate is available;
determine if the candidate is qualified; and
designate the candidate as successor to succeed the asset in control if the candidate is available and qualified.

2. The system of claim 1 wherein the processor is further configured to determine if the candidate is approved by an authority, and
wherein the processor being configured to designate the candidate as the successor if the candidate to succeed the asset in control is available and qualified comprises the processor being configured to designate the candidate as the successor if the candidate to succeed the asset in control is available, qualified and approved by the authority.

3. The system of claim 1 wherein the processor is further configured to:
notify affected resources of the successor; and
perform updates based on the successor.

4. The system of claim 1 wherein the processor is further configured to determine an unavailability of the asset in control.

5. The system of claim 1 wherein the processor is further configured to determine the candidate to succeed the asset in control based on policies stored in a computer readable medium.

6. The system of claim 1 wherein the processor is configured to provide a command succession list.

7. The system of claim 1 wherein the asset in control comprises a person.

8. The system of claim 1 wherein the asset in control comprises a thing.

9. The system of claim 1 wherein the processor is further configured to:
determine if a new asset is available;
determine if the new asset has a higher priority than a current asset in control;
notify the affected resources that the new asset is assuming control if the new asset has a higher priority than the current asset in control; and
perform updates based on the new asset assuming control if the new asset has a higher priority than the current asset in control.

10. An article comprising:
a machine-readable medium that stores executable instructions that cause a machine to:
determine or receive a candidate to succeed an asset in control in response to a level of user intervention selected by a user from a plurality of levels of user intervention;
determine if the candidate is available, qualified and approved by an authority; and
designate the candidate as the successor to succeed the asset in control if the candidate is available, qualified and approved by an authority.

11. The article of claim 10 wherein the instructions cause the machine to:
notify affected resources of the successor; and
perform updates based on the successor.

12. The article of claim 10 wherein the instructions cause the machine to determine an unavailability of the asset in control.

13. The article of claim 10 wherein the instructions cause the machine to determine the candidate based on policies stored in a computer readable medium.

14. The article of claim 10 wherein the asset in control comprises at least one of a person or a thing.

15. The system of claim 10 wherein the instructions cause a machine to:
determine if a new asset is available;
determine if the new asset has a higher priority than a current asset in control;
notify the affected resources that the new asset is assuming control if the new asset has a higher priority than the current asset in control; and
perform updates based on the new asset assuming control if the new asset has a higher priority than the current asset in control.

16. A method, comprising:
using a processor to:
determine or receive a candidate to succeed an asset in control in response to a level of user intervention selected by a user from a plurality of levels of user intervention;
determine if the candidate is available, qualified and approved by an authority;
designate the candidate as successor to succeed the asset in control if the candidate is available, qualified and approved by an authority;
notify affected resources of the successor; and
perform updates based on the successor,
wherein the asset in control comprises at least one of a person or a thing.

17. The method of claim 16, further comprising using the processor to determine an unavailability of the asset in control.

18. The method of claim 16, further comprising using the processor to determine the candidate based on policies stored in a computer readable medium.

19. The method of claim 16, further comprising using the computer to:
determine if a new asset is available;
determine if the new asset has a higher priority than the current asset in control;
notify the affected resources that the new asset is assuming control if the new asset has a higher priority than the current asset in control; and
perform updates based on the new asset assuming control if the new asset has a higher priority than the current asset in control.

20. The system of claim 1 wherein the plurality of levels of user intervention comprises:
a first level of user intervention comprising the processor providing a command succession list in response to a request by a user and receiving the candidate from a user; and
a second level of user intervention comprising the processor determining the candidate and designating the successor without user intervention.

* * * * *